(12) United States Patent  
Yuval

(10) Patent No.: US 7,711,861 B2
(45) Date of Patent: May 4, 2010

(54) SYNCHRONIZED INDICATOR LIGHT FOR SECURE CONNECTIONS

(75) Inventor: Gideon Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/512,939

(22) Filed: Aug. 30, 2006

(65) Prior Publication Data

US 2008/0125038 A1    May 29, 2008

(51) Int. Cl.
G06F 15/16 (2006.01)
G06F 3/00 (2006.01)

(52) U.S. Cl. .................... 710/8; 709/208; 709/209; 710/1

(58) Field of Classification Search ............... 455/42.2; 709/208, 209; 710/1, 8
See application file for complete search history.

(56) References Cited

U.S. PATENT DOCUMENTS

| 2002/0123325 A1 | 9/2002 | Cooper |
| 2002/0131445 A1 | 9/2002 | Skubic et al. |
| 2002/0183005 A1 | 12/2002 | Yi et al. |
| 2002/0194500 A1 | 12/2002 | Bajikar |
| 2003/0050009 A1 | 3/2003 | Kurisko et al. |
| 2004/0073795 A1* | 4/2004 | Jablon ........................ 713/171 |
| 2004/0083368 A1 | 4/2004 | Gehrmann |
| 2004/0203357 A1 | 10/2004 | Nassimi |
| 2005/0009469 A1 | 1/2005 | Kotola |
| 2005/0266798 A1 | 12/2005 | Moloney et al. |
| 2006/0101266 A1 | 5/2006 | Klassen et al. |
| 2006/0195695 A1* | 8/2006 | Keys .......................... 713/169 |

FOREIGN PATENT DOCUMENTS

| EP | 1596538 A1 | 11/2005 |
| WO | WO02056536 A1 | 7/2002 |

OTHER PUBLICATIONS

"Sony Gets Approval to Sell Bluetooth GPS Unit for CLIÉ", http://www.palmloyal.com/addons.php?name=News&file=article&sid=1691.
Kim, et al., "A Bypassing Security Model for Anonymous Bluetooth Peers", Date: 2005, http://www-sop.inria.fr/planete/hkim/downloads/papers/MM1-7.pdf.
Vainio, Juha T., "Bluetooth Security", Date: May 25, 2000, http://www.niksula.hut.fi/~jiitv/bluesec.html.
Wong, et al., "Repairing the Bluetooth pairing protocol", Date: 2005, http://www.cl.cam.ac.uk/~fms27/papers/2005-WongStaClubluetooth.pdf.

* cited by examiner

Primary Examiner—Alford W Kindred
Assistant Examiner—Richard Franklin

(57) ABSTRACT

A secure communication channel between first and second radio frequency communication devices is indicated by the synchronized indicators on each of the two devices. The indicator may be a light or speaker. After a secure channel is established, the indicators may be simultaneously operated so that a user may definitively and positively determine that the two devices are securely connected to each other. Any interloper devices would not be indicating on the same pattern and thereby be identified.

20 Claims, 3 Drawing Sheets

SYNCHRONIZED INDICATOR LIGHT FOR SECURE CONNECTIONS

BACKGROUND

Many devices connect to each other using radio frequency communications. Several protocols and standards, including BLUETOOTH™, can be used to establish secure communications between two devices. For example, a cellular telephone may establish a secure communication channel with a wireless headset to enable hands-free operation of the cellular telephone.

Because of the ubiquitous nature of wireless devices, there is an opportunity for security breaches as several devices may operate in the same general vicinity and in the same frequency space. Interloper devices may intentionally or unintentionally establish a connection with a user's device and breach the user's security.

As devices become more miniaturized, the user interface for the device becomes very limited. For example, today's wireless headsets may have a button that is used for on/off power as well as other functions for the headset. The other interfaces may be an indicator light, a microphone, and a speaker. There is often no place for a user interface display with text, graphics, or other visual indicator, and sometimes there is very limited space for input devices such as switches. When such a limited user interface exists, it is difficult to positively communicate the status of a communication session.

SUMMARY

A secure communication channel between first and second radio frequency communication devices is indicated by the synchronized indicators on each of the two devices. The indicator may be a light or speaker. After a secure channel is established, the indicators on both connected devices may be simultaneously operated so that a user may definitively and positively determine that the two devices are securely connected to each other. Any interloper devices would not be indicating on the same pattern and thereby be identified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
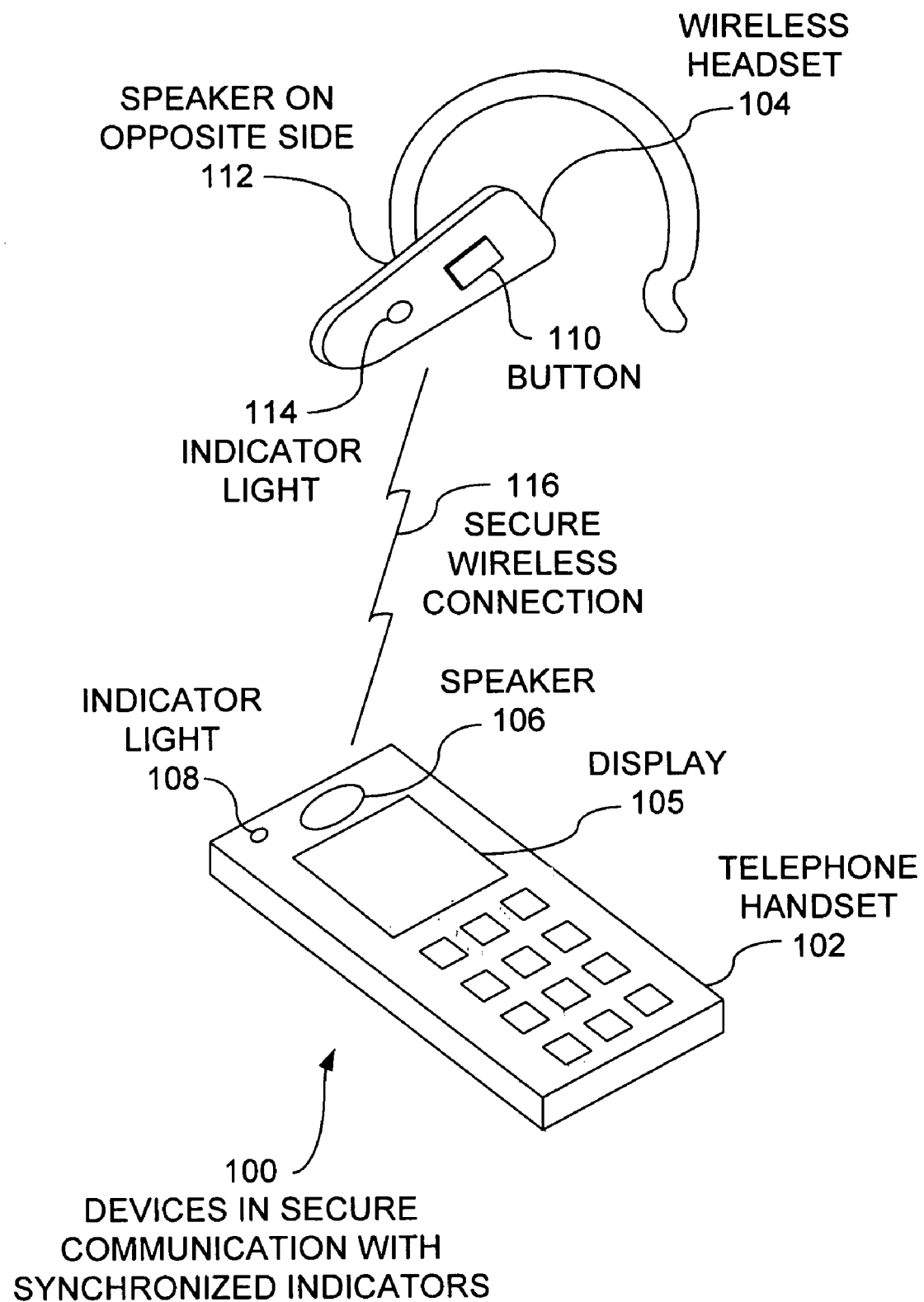
FIG. 1 is a pictorial illustration of an embodiment showing a system with connected devices having synchronized indicators.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system where devices in secure communication mode are able to synchronize indicators. The telephone handset 102 is wirelessly connected to a wireless headset 104. The telephone handset 102 has a display 105, a speaker 106, and an indicator light 108. The wireless headset 104 has a button 110, a speaker 112 located on the far side of the device, and an indicator light 114. The telephone handset 102 and the wireless headset 104 are connected using a secure wireless connection 116.

When two devices, in this case the telephone handset 102 and the wireless headset 104, are connected using a secure wireless connection 116, an indicator on each device may be operated in a synchronized mode as a positive indication that a secure communications link is established between the two devices. For example, the indicator light 108 on the telephone 102 may blink in synchronization with the indicator light 114 of the headset 104. In another embodiment, the speaker 106 on the telephone 102 may make a sound in synchronization with the indicator light 114 or a sound played on the speaker 112.

When a user establishes a secure wireless connection between the two devices, the user may check that the secure connection exists by looking or listening to the two devices near each other. If the two devices are indicating in unison, a secure connection is established. If the devices are not indicting in unison, one or both devices may be in communication with a third device. Such a device may be an interloper device that may maliciously intercept a communication, or just may be inadvertently connected. In either event, the user may experience difficulties if the two devices that were intended to be connected were, in fact, not connected.

Visual or audible indicators that are operated in synchronization are an easily understandable mechanism for a person to verify connectivity. The user merely has to view or listen to both devices simultaneously in order to know beyond a doubt that the two devices are properly connected. Such an indication transcends language and cognitive abilities, and may be universally understood.

The synchronized mode of the indicators may be a steady pulsating beat, a changing beat or other rhythmic pattern, or may be a random indication. The more complex an indication is, the less likely an interloper or other third device may be able to mimic the pattern and thus the user may have more confidence that the devices were properly connected.

In some embodiments, the indicators may operate simultaneously, while in other embodiments, the indicators may operate alternatively. A simultaneous operation is one in which both indicators indicate at the same time and for the same duration. An alternative indication is one in which one indicator is on while the other is off, and vise versa.

The devices may be any type of wireless device that can provide a secure connection. In some embodiments, such as BLUETOOTH™, the devices are arranged in a master/slave relationship. In other embodiments, the devices may be arranged in a peer-to-peer relationship. The wireless connection may be with radio transceivers, infrared transceivers, ultrasonic transceivers, or any other wireless communication protocol. The various protocols to which a synchronized indicator light may apply includes BLUETOOTH™ (IEEE 802.15.1), IrDA, IEEE 802.11, WIMAX™ (IEEE 802.16), or any other wireless communication protocol.

The devices particularly suited for the synchronized indicators are those that have very limited user interfaces. For example, some BLUETOOTH™ enabled headsets have only a multi-function button and a multi-function indicator light. By synchronizing the indicators of two devices through the wireless connection, a positive indication of connection may be assured with a crude user interface. Some devices, such as a laptop computer or a telephone handset may have complex graphical displays. When such a display is available, a graphical button or flashing indicator may be shown on the display in addition to or instead of a separate, dedicated indicator light or speaker.

In some situations, one indicator on a device may be an audio indicator while the indicator on the other device may be an audio or other multimedia indicator. In the present embodiment 100, a user may attach the wireless headset 104 to an ear and establish the secure connection 116. When the connection is secure, the headset 104 may play a beep sound that starts and stops in unison with the indicator light 108 on the telephone 102. In some embodiments, the indicator may continue to indicate in unison with the other indicator during the entire connection. In other embodiments, especially when an audio indicator is used, an indicator may operate for a predetermined amount of time or the user may be able to mute or otherwise disable the indicator.

Figure 2:
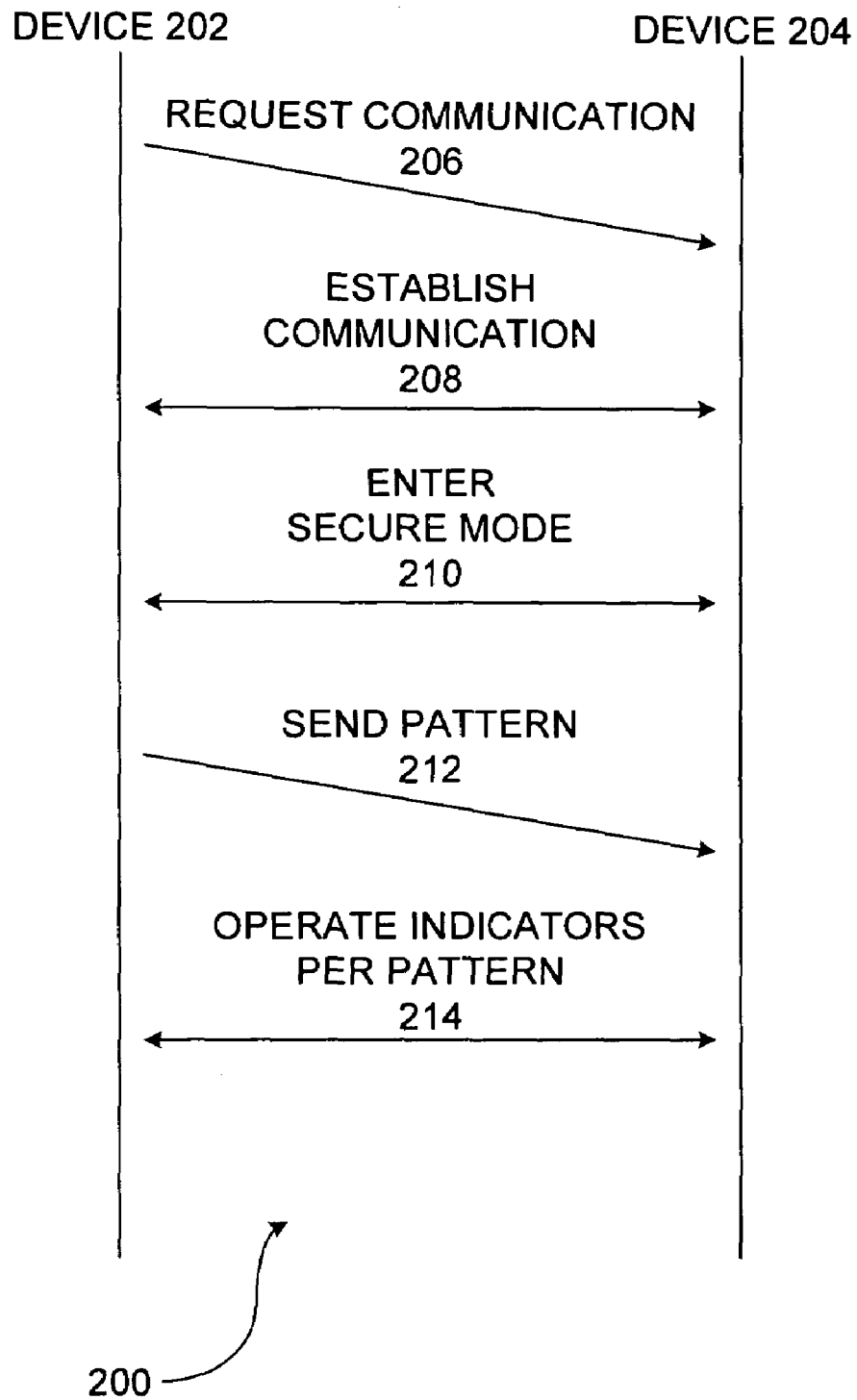
FIG. 2 is a timeline diagram of an embodiment showing a sequence for secure communications with synchronized indicators.

FIG. 2 is a communication sequence embodiment 200 showing a sequence for secure communications with synchronized indicators. The communications between device 202 and device 204 are illustrated. Devices 202 and 204 may be any type of devices capable of wireless communication, examples of which may be the telephone handset 102 and the wireless headset 104'.

Device 202 requests communication 206 with device 204, then communication is established 208. The devices may enter a secure mode 210 once initial communications are established. The particular protocol used for requesting and establishing communications between two devices may vary greatly, and many different protocols may be used. In some embodiments, the secure mode may be inherent in the initial communication 208, while in other embodiments, a secure mode may be a second and discrete step.

After secure communications are established, device 202 may send an indicator pattern 212 to device 204. The devices 202 and 204 may operate their respective indicators based on the pattern.

In some embodiments, the pattern may be transmitted before communications are established. For example, an indicator pattern or sequence may be established as part of the communications protocol. An instance may be a pulsating indicator pattern or another repeated or rhythmic pattern that is defined within the communications protocol.

In other embodiments, the pattern may be transmitted from device 202 to device 204 in real time. An example may be a random pattern that is communicated from a master device to a slave device, where the slave device turns on and off an indicator in response to real time input from the master device along the communications path.

Figure 3:
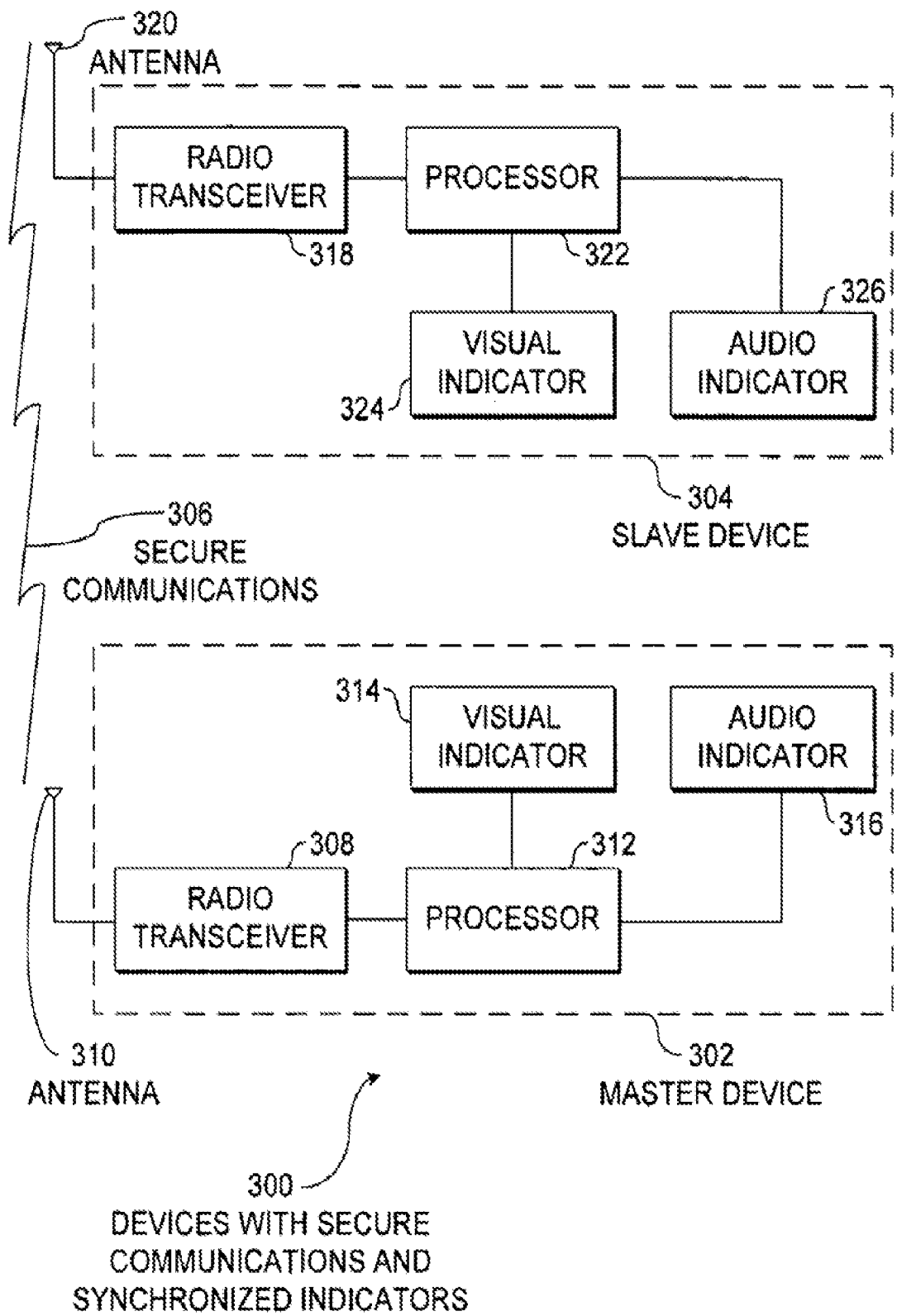
FIG. 3 is a diagrammatic illustration of an embodiment showing devices with secure communications and synchronized indicators.

FIG. 3 is a diagrammatic illustration of an embodiment 300 showing two devices capable of secure communications and having synchronized indicators. A master device 302 and a slave device 304 are connected through secure wireless communications 306. The master device 302 comprises a radio transceiver 308 with an antenna 310, and a processor 312 that may control a visual indicator 314 and an audio indicator 316. The slave device 304 comprises a radio transceiver 318 with an antenna 320, and a processor 322 that may control a visual indicator 324 and an audio indicator 326.

The embodiment 300 is an example of a system that uses a radio protocol that requires a master and slave relationship. An example of such a protocol is BLUETOOTH™. Each protocol may have different terms and techniques for establishing communications and for creating a secure communication. Other protocols, such as IEEE 802.11, may use a peer-to-peer type relationship between the devices. In a master/slave relationship, the master device 302 may define certain parameters or perform certain functions in creating, managing, and destroying the communication channel.

In some embodiments, a device may have one or both of a visual indicator and/or an audio indicator. The visual indicators 314 and 324 may be a single light such as a light emitting diode (LED) that is operated in an on/off fashion or with variable intensity. Other visual indicators may include a monochromatic or color display with text, graphics, and other images. The audio indicators may be low quality piezo-electric buzzers, high quality speakers, or any other audio emitting device.

Each device may have a processor 312 and 322. The processor 312 and 322 may be microprocessors capable of executing a set of commands stored in a memory device. The memory device may be reprogrammable or otherwise changeable in some instances, while in other instances the memory device may be a read only memory (ROM). The processors 312 and 322 may also be a state machine, application specific integrated circuit (ASIC), or any other circuit or device that performs a specific function.

The processors 312 and 322 may be integrated into and perform some of the communication functions of the radio transceivers 308 and 318.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    establishing a communication session from a first device of a user to a second device of the user, said first device comprising a first radio transceiver and a first indicator;
    entering a secure communication mode with said first device;
    establishing, at said first device of said user, an indication sequence comprising a random pattern of at least one of light blinks and sounds for operating a second indicator of said second device of said user;
    sending said indication sequence in said secure communication mode from said first device to said second device; and
    causing said first indicator of said first device and said second indicator of said second device to indicate using said indication sequence, wherein said first indicator and said second indicator synchronize if said first device and said second device are communicating in said secure mode and do not synchronize if at least one of said first device and said second device is in communication with a third device.

2. The method of claim 1 wherein said first indicator is a visual indicator.

3. The method of claim 1 wherein said first indicator is an audio indicator.

4. The method of claim 1 wherein said second indicator is a visual indicator.

5. The method of claim 1 wherein said second indicator is an audio indicator.

6. The method of claim 1 wherein said indication sequence is sent over a wireless connection.

7. The method of claim 1 wherein said indication sequence is includes a random pattern of sounds comprising a rhythmic pattern.

8. The method of claim 1 wherein said indication sequence is causes one of said first indicator and said second indicator to indicate said random pattern said using sounds and the other of said first indicator and said second indicator to indicate said random pattern using light blinks.

9. The method of claim 1 wherein said first indicator and said second indicator indicate simultaneously when synchronized.

10. A method comprising:
    establishing a communication session from a first device of a user to a second device of the user, said first device comprising a first radio transceiver and a first indicator;
    entering a secure communication mode with said first device;
    establishing an indication sequence for said first indicator;
    sending said indication sequence in said secure communication mode from said first device to said second device; and
    causing said first indicator and a second indicator of said second device to indicate using said indication sequence, wherein said first indicator and said second indicator:
    synchronize if said first device and said second device are communicating in said secure mode,
    do not synchronize if at least one of said first device and said second device is in communication with a third device, and
    indicate alternatively when synchronized.

11. A slave device of a user in a master/slave communications system of the user comprising:
    a first radio transceiver;
    a first indicator; and
    a processor adapted to:
        establish communications with a second device of the user operating in a secure communication mode, said second device comprising a second radio transceiver and a second indicator;
        receive an indication sequence comprising a random pattern of at least one of light blinks and sounds for operating said first indicator of said slave device of said user, wherein said indication sequence was established at said second device of said user and sent from said second device in said secure communication mode; and
        indicate said first indicator in conjunction with said second indicator using said indication sequence, wherein said first indicator and said second indicator synchronize if said slave device and said second device are communicating in said secure mode and do not synchronize if at least one of said slave device and said second device is in communication with a third device.

12. The slave device of claim 11 wherein said first indicator is a visual indicator.

13. The slave device of claim 11 wherein said first indicator is an audio indicator.

14. The slave device of claim 11 wherein said second indicator is a visual indicator.

15. The slave device of claim 11 wherein said second indicator is an audio indicator.

16. The slave device of claim 11 wherein said indication sequence is received over a wireless connection.

17. The slave device of claim 11 wherein said indication sequence includes a random pattern of sounds comprising a rhythmic pattern.

18. The slave device of claim 11 wherein said indication sequence causes one of said first indicator and said second indicator to indicate said random pattern said using sounds and the other of said first indicator and said second indicator to indicate said random pattern using light blinks.

19. The slave device of claim 11 wherein said first indicator and said second indicator indicate simultaneously when synchronized.

20. A slave device of a user in a master/slave communications system of the user comprising:

a first radio transceiver;

a first indicator; and a processor adapted to:

establish communications with a second device of the user operating in a secure communication mode, said second device comprising a second radio transceiver and a second indicator;

receive an indication sequence sent from said second device in said secure communication mode; and indicate said first indicator in conjunction with said second indicator using said indication sequence, wherein said first indicator and said second indicator:

synchronize if said slave device and said second device are communicating in said secure mode, do not synchronize if at least one of said slave device and said second device is in communication with a third device, and indicate alternatively when synchronized.

* * * * *

UNITED STATES PATENT AND TRADEMARK OFFICE
CERTIFICATE OF CORRECTION

| | | |
|---|---|---|
| PATENT NO. | : 7,711,861 B2 | Page 1 of 1 |
| APPLICATION NO. | : 11/512939 | |
| DATED | : May 4, 2010 | |
| INVENTOR(S) | : Gideon Yuval | |

It is certified that error appears in the above-identified patent and that said Letters Patent is hereby corrected as shown below:

In column 6, line 15, in Claim 7, before "includes" delete "is".

In column 6, line 18, in Claim 8, before "causes" delete "is".

Signed and Sealed this
Twenty-second Day of February, 2011

David J. Kappos
*Director of the United States Patent and Trademark Office*